United States Patent [19]
Bodine et al.

[11] 4,091,988
[45] May 30, 1978

[54] CENTRIFUGAL TRAP FOR SOLID PARTICLES

[75] Inventors: Albert G. Bodine, Van Nuys; Ernest Alfred von Seggern, Burbank, both of Calif.

[73] Assignee: Albert G. Bodine, Van Nuys, Calif.

[21] Appl. No.: 698,286

[22] Filed: June 21, 1976

[51] Int. Cl.² .............................................. B04B 1/00
[52] U.S. Cl. ................................. 233/1 R; 210/360 A
[58] Field of Search ................ 233/46, 31, 37, 43, 233/1 A, 18, 20 R; 210/322, 360 R, 370, 360 A; 175/107; 184/6.24

[56] References Cited

U.S. PATENT DOCUMENTS

| | | | |
|---|---|---|---|
| 1,071,870 | 9/1913 | Boss | 233/15 |
| 1,129,178 | 2/1915 | D'Olier et al. | 233/43 |
| 2,450,737 | 10/1948 | Rundquist | 233/46 X |
| 2,982,417 | 5/1961 | Durrell | 233/1 A X |
| 3,168,472 | 2/1965 | Fitzsimmons | 233/46 X |
| 3,250,462 | 5/1966 | Thylefors | 233/14 R |
| 3,659,662 | 5/1972 | Dicky | 175/107 |

*Primary Examiner*—David H. Brown
*Attorney, Agent, or Firm*—Edward A. Sokolski

[57] ABSTRACT

A centrifugal trap for preventing solid particles such as sand from reaching water lubricated bearings. The ambient water which is used for lubricating a bearing is passed through a maze structure which includes a first longitudinal annular channel which is substantially concentric with the shaft supported by the bearing, and a second lateral annular channel which is also concentric with the shaft, into a longitudinal annular separating chamber. A centrifugal force is generated in the liquid by rotating a cylindrical member forming one of the walls of the channels and the chamber, which causes sand particles and the like to be driven outwardly against the longitudinal portions of the walls. The liquid, the particles having been separated therefrom, is passed from the centrifugal separating chamber through an inner longitudinal annular channel, which is concentric with the shaft, to the shaft bearing.

7 Claims, 1 Drawing Figure

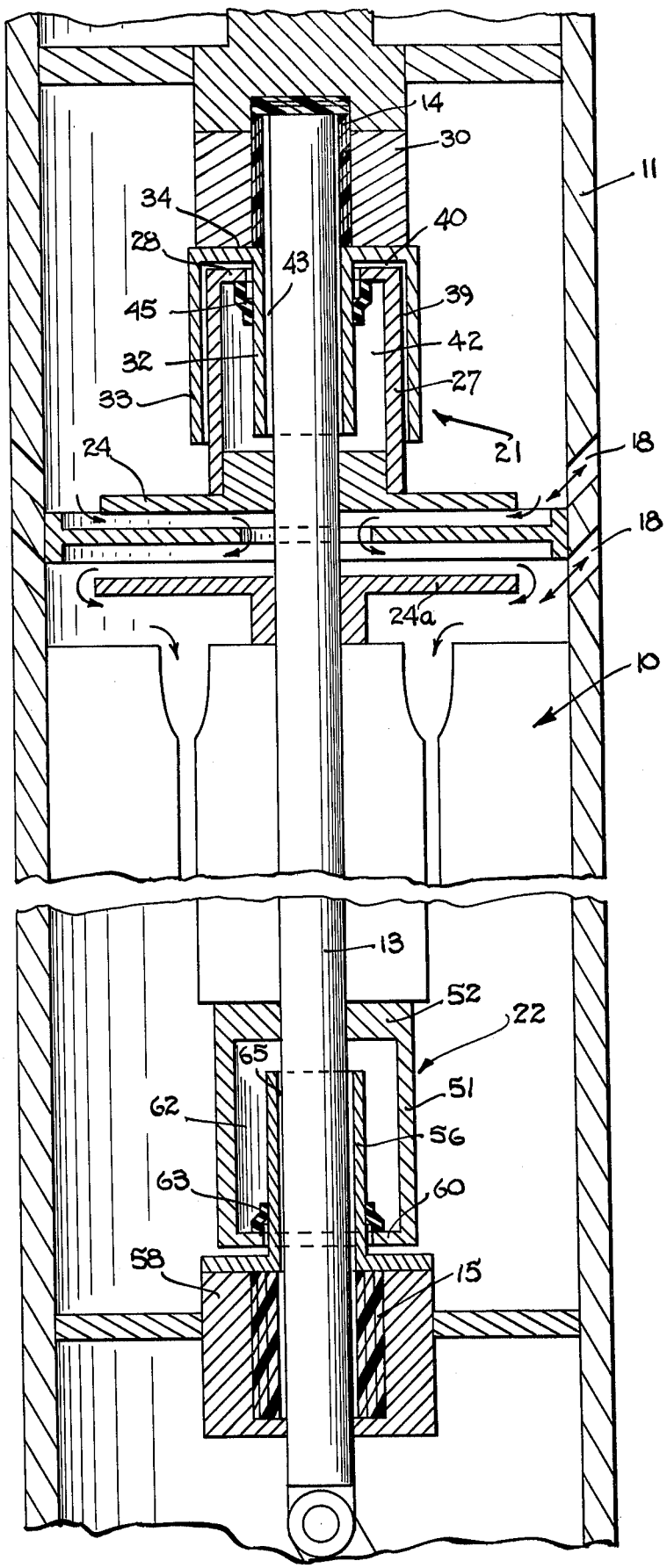

CENTRIFUGAL TRAP FOR SOLID PARTICLES

This invention relates to centrifugal traps for separating solid particles from a liquid, and more particularly to such a device for use in preventing such particles from reaching the water lubricated bearings of rotating machinery.

In the operation of rotating machinery such as, for example, the turbine drive mechanism for a sonic oscillator as described in connection with FIGS. 7-10 of U.S. Pat. No. 3,633,688 issued Jan. 11, 1972, to A. G. Bodine, one of the co-inventors of the present application, which utilizes water lubricated bearings, it is essential that foreign particles such as sand and mud be prevented from reaching such bearings to avoid damage to the equipment. Where such equipment is used for drilling through earthen material, this problem becomes especially acute and often obviates the use of water lubricated bearings in favor of sealed bearings. The use of sealed bearings often presents a problem where the device is to be operated at a considerable depth below the surface in an oil well or the like, where high hydrostatic pressures occur and often cause damage to the bearing seals.

The present invention overcomes the aforementioned problems by providing means for efficiently separating particles out from the ambient liquid so that such liquid can be used to lubricate the bearings without fear of damage thereto. The device of the present invention is relatively simple in its construction, yet highly efficient in its separating action, and in the preferred embodiment requires no external power, rather operating in response to the rotation of the shaft supported on the bearings being lubricated.

It is therefore an object of this invention to enable the use of water lubrication for bearings without fear of damage thereto by foreign particles carried in the water.

It is a further object of this invention to provide a centrifugal trap or filter for eliminating foreign particles from water used to lubricate bearings which is of relatively simple construction yet highly efficient in its operation.

Other objects of this invention will become apparent as the description proceeds in connection with the accompanying drawings, of which the sole FIGURE is a cross sectional view of a preferred embodiment of the invention.

Briefly described, a preferred embodiment of the device of the invention is as follows: A centrifugal filter unit is mounted in external concentricity with a shaft having water lubricated bearings so as to filter the water supplied to such bearings. A portion of the filter unit is rotatably driven, this end result being achieved in the preferred embodiment by coupling this filter portion to the shaft. The rotatable portion of the filter unit comprises a cylindrical section substantially concentric with the rotation axis of the shaft, and a transverse annular section which extends from one end of the cylindrical section radially inwardly towards the shaft rotation axis. The filter unit also comprises a fixedly mounted portion which has a cylindrical section which is externally concentric with the rotatable cylindrical section, a second cylindrical section internally concentric with the rotatable cylindrical section and proximate to the shaft, and a radial section which joins one of the ends of the cylindrical sections together. A maze-like channel structure is formed between the rotatable and stationary portions and the shaft and the inner stationary cylindrical section, a separation chamber which is part of this maze being formed between the inner walls of the rotatable cylindrical section and the outer walls of the inner stationary cylindrical section. A rubber flap-ring is provided in the preferred embodiment at the entry for the liquid into the separation chamber, this chamber thus being closed to the ambient water until the rotatable portion gets up to speed, at which time the flap-ring seal is opened by centrifugal force to permit the entry of the water. In its operation, the rotatable filter portion is rotatably driven at relatively high speed, providing a centrifugal force which operates to cause sand and other foreign particles to be driven outwardly and thus separated from the liquid at the locations along the shaft where the bearings are located.

Referring now to the sole FIGURE, a preferred embodiment of the invention is illustrated. Drill stem 11 has a shaft 13 mounted therein for rotation on cylindrical bearings 14 and 15. Bearings 14 and 15 may be fabricated of a hard plastic material such as Micarta, and are water lubricated with water supplied from the ambient water in the well or the like being drilled. Shaft 13 may be rotatably driven by a turbine mechanism 10 (not shown here in detail), as described in connection with FIGS. 7-10 of the aforementioned U.S. Pat. No. 3,633,688. It is to be noted that the ambient water is free to circulate in the interior of hollow drill stem 11 and outside pressure is permitted to communicate with the interior of this drill stem through sand slinger discharge apertures 18 formed in the wall thereof.

The centrifugal trap assemblies 21 and 22 have portions which are fixedly attached to shaft 13 and rotate therewith. In assembly 21 this rotatable portion comprises "slinger" members 24 and 24a which are fixedly attached to shaft 13 to centrifugally throw some sand particles out through ports 18. Slinger 24 supports cylindrical member 27 which is concentric with shaft 13. Cylindrical member 27 has a radially inwardly extending annular member 28 attached to the top end thereof. Fixedly supported on post member 30, which in turn is supported on stem 11, are inner fixed cylindrical member 32 and outer fixed cylindrical member 33. Cylindrical members 32 and 33 are joined together at the top ends thereof by radial ring member 34. Outer cylindrical member 33 is externally concentric with rotatable cylinder 27, while inner cylindrical member 32 is externally concentric with the rotatable shaft 13. Fluid communication is provided between the chamber formed within stem 11 and bearing 14 by means of a "maze" formed by channels 39 and 40, chamber 42, and channel 43. As can be seen, the water first enters channel 39 at the bottom end thereof, passes vertically upwardly through this channel to channel 40, then passes radially inwardly through channel 40. From channel 40, the water passes downwardly through rubber flap-ring 45 (at times that shaft 13 is rotating so that the seal formed by the flap-ring is open) into chamber 42, and finally from chamber 42 upwardly through channel 43 to bearing 14.

With shaft 13 rotating and along with it member 27, particles in the fluid passing up through channel 39 and radially inwardly through channel 40 are thrust outwardly by the centrifugal force so as to prevent most of these particles from entering chamber 42. Any such particles that do enter chamber 42 are thrust centrifugally outwardly against the outer walls of this chamber and thus prevented from entering channel 43 which is inward of these outer walls. It is to be noted that before the fluid can enter channel 43 it is necessary that it move all the way down to the bottom of chamber 42. By the time the fluid has reached this point it is thoroughly purified of any solid particles. Therefore the water which reaches bearing 14 has been thoroughly centrifugally cleaned. It is to be noted that this invention makes the use of the drill possible inside of an oil well without the need for high pressure seals. The water in the bearing can always be at the same pressure as the hydrostatic head outside stem 11, no matter what the depth setting of the drill.

Annular flap-ring 45 which is fabricated of an elastic material such as rubber, prevents sand laden water from entering chamber 42 when the drill is first placed in operating position before shaft 13 has gotten up to speed. Clean liquid is placed in chamber 42 and this liquid serves to lubricate the bearing until the shaft gets up to speed, whereupon flap-ring 45 opens to permit the entry of ambient liquid to balance the pressure and continue the lubrication.

Lower centrifugal filter 22 utilizes the same basic features but does not employ the outer stationary cylindrical member 33 of filter 21, or the longitudinal channel 39 formed thereby. In this lower filter, rotatable cylindrical member 51 is fixedly attached to shaft 13 by radial ring member 52. An inner stationary cylindrical member 56 is fixedly supported on support assembly 58 which is attached to stem 11. A radial ring member 60 extends inwardly from the bottom of cylinder 51. Separation chamber 62 is formed between stationary cylindrical member 56 and rotatable cylindrical member 51, an entrance to this chamber being formed by the space between ring member 60 and cylindrical member 56. Annular flexible flap-ring 63 operates in the same manner as flap-ring 45 of filter unit 21 to prevent ambient fluid from freely mixing with the contents of chamber 62 until shaft 13 is up to speed. Liquid passes from chamber 62 through longitudinal channel 65 formed between cylinder 56 and shaft 13 to bearing 15. Filter 22 thus operates in the same fashion as filter 21 to centrifugally drive solid particles outwardly away from shaft 13 such that the fluid reaching bearing 15 is thoroughly cleaned of such particles.

This centrifugal extraction of undesirable abrasive sand particles is also useful for prolonging the life of turbine 10. In this connection, it is to be noted that the mud flow into turbine 10 is initially conducted through and in opposition to the centrifugal labyrinth provided by slingers 24 and 24a. The kinetic energy from the centrifugal action on the slinger tends to reverse the sand particles and throw them out through ports 18. This reduces the amount of sand going through turbine 10.

While the invention has been described and illustrated in detail, it is to be clearly understood that this is intended by way of illustration and example only, and is not to be taken by way of limitation, the spirit and scope of this invention being limited only by the terms of the following claims.

We claim:

1. In a rotating machine having a shaft rotatably supported on a bearing which is lubricated by an ambient supply of water, the improvement being a centrifugal filter unit mounted in external concentricity with said shaft for filtering out solid particles from said water, comprising:
    a rotatable cylindrical member mounted in external concentricity with said shaft,
    said rotatable cylindrical member being coupled to said shaft for rotation therewith,
    a fixed cylindrical member mounted between said rotatable member and said shaft in external concentricity with said shaft and internal concentricity with said rotatable member,
    an annular chamber axially related to said shaft being formed between said cylindrical members and an annular channel axially related to said shaft being formed between said fixed cylindrical member and said shaft, water being supplied to said bearing through said channel, said chamber having an inlet on one end thereof and an outlet in communication with said channel on the opposite end thereof,
    whereby when said rotatable member is rotatably driven said particles are centrifugally driven outwardly against the inner walls of said chamber, thereby cleansing of said particles the water supplied through said channel to said bearing.

2. The device of claim 1 wherein said annular chamber and annular channel are concentric with said shaft and said cylindrical members.

3. The device of claim 1 and further including means mounted at the inlet of said chamber for closing said inlet when said rotatable cylinder is rotating below a predetermined speed and opening said inlet when said rotatable cylinder is rotating at a speed greater than said predetermined speed.

4. The device of claim 1 and further including a second fixed cylindrical member connected to said first fixed cylindrical member at one end thereof, said second fixed cylindrical member being positioned in external concentricity with said rotatable cylindrical member, a second annular channel axially related to said shaft being formed between said second fixed cylindrical member and said rotatable cylindrical member, an inlet for the fluid being formed on one end of said last mentioned channel, the other end of said last mentioned channel being in fluid communication with the inlet to said chamber.

5. The device of claim 4 wherein said second fixed cylindrical member is joined to the first fixed cylindrical member by a ring member radially related to said shaft, a ring member extending radially inwardly towards said shaft from one end of said rotatable cylinder member, a radial channel being formed between said ring members, said radial channel providing fluid communication between said first and second annular channels.

6. The device of claim 5 and further including means mounted at the inlet of said chamber for closing said inlet when said rotatable cylindrical member is rotating below a predetermined speed and opening said inlet when said rotatable cylindrical member is rotating at a speed greater than said predetermined speed.

7. The device of claim 6 wherein said means mounted at said inlet comprises a resilient flap ring connected to said rotatable cylindrical member for rotation therewith.

* * * * *